Feb. 10, 1942.                M. W. EATON                2,272,458
                         THERMOSTATIC CONTROL
                         Filed Feb. 2, 1939          3 Sheets-Sheet 1
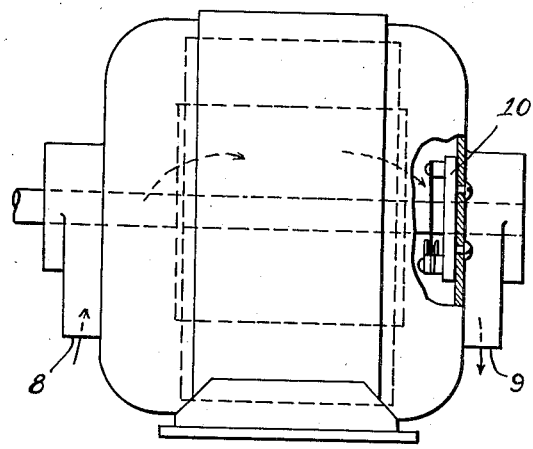
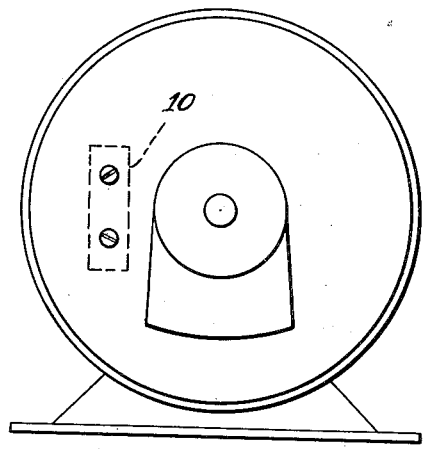
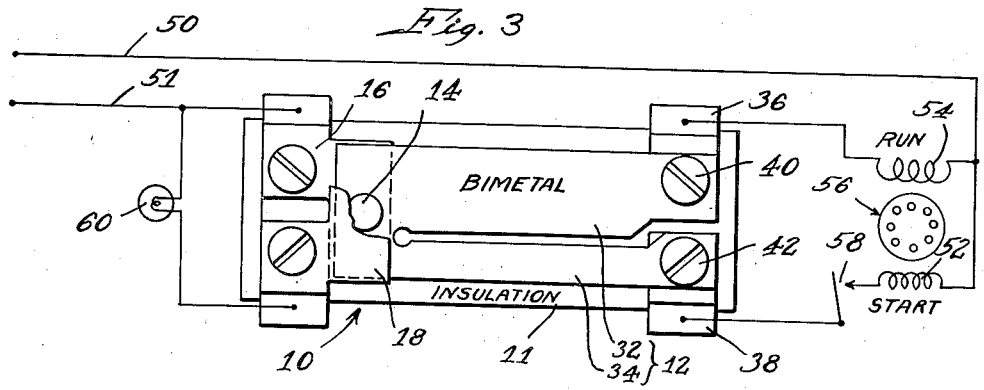
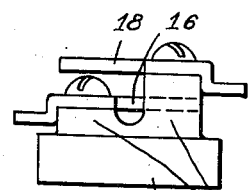
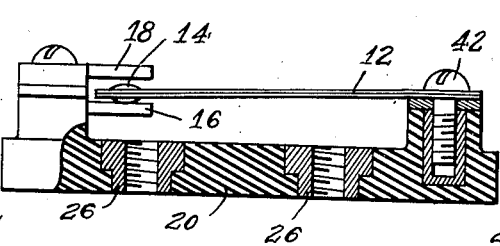
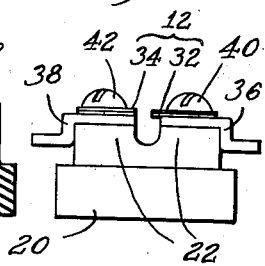
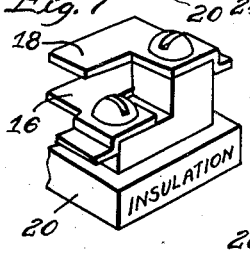
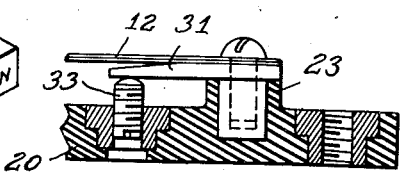
Inventor:
MALCOLM W. EATON
By Karl H. Sommermeyer
        Atty.

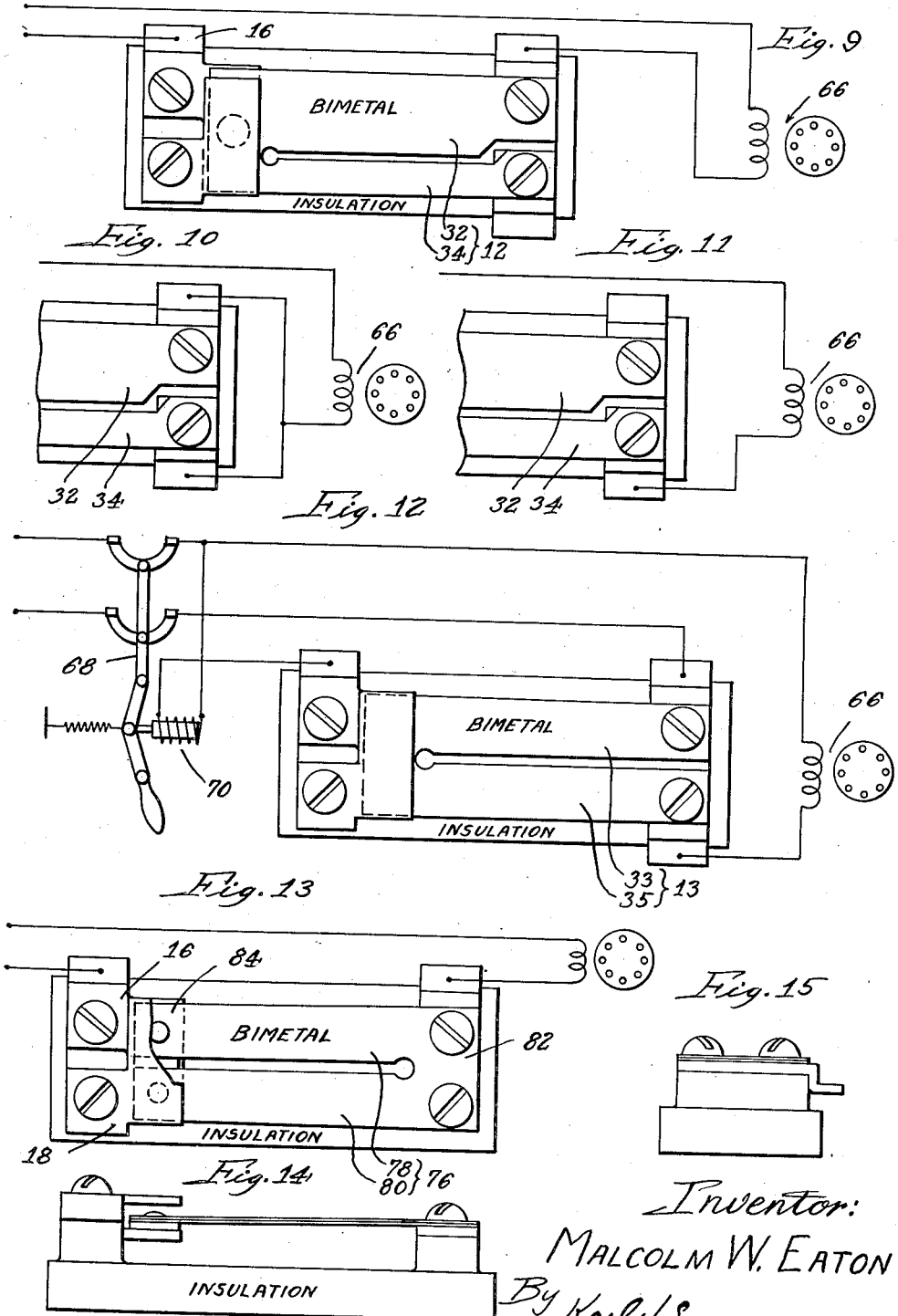

Patented Feb. 10, 1942

2,272,458

UNITED STATES PATENT OFFICE 2,272,458

THERMOSTATIC CONTROL

Malcolm W. Eaton, Freeport, Ill., assignor to Micro Switch Corporation, Freeport, Ill., a corporation of Illinois Application February 2, 1939, Serial No. 254,140

12 Claims. (Cl. 200—138)

The present invention relates generally to thermostats, and more particularly to snap acting bimetal electric thermostats.

Objects of the invention include the provision of an improved snap acting thermostatic switch and thermal relay, and the provision of an improved circuit controlling protector for electric motors and the like. These and other objects will become apparent as the following description proceeds. The invention resides in certain new and improved features of construction, combinations of elements, and arrangements of parts, and certain specific embodiments thereof, shown and described herein, serve by way of example to illustrate the manner in which the invention may be used and practiced.

Certain constructions and arrangements of apparatus, herein shown and described, are described and claimed in the co-pending application of M. W. Eaton, Serial No. 174,042, filed November 11, 1937, now Patent 2,172,673, issued September 12, 1939.

In the drawings,

Figs. 1 and 2 are side and end views respectively, of an electric motor, having the thermostatic control device of the present invention mounted in the end-bell thereof;

Fig. 3 illustrates a thermostatic protector for an electric motor constructed according to my present invention and includes a diagrammatic representation of an electric motor protected thereby;

Figs. 4, 5, 6, and 7 are additional views of the thermostatic controlling device of Fig. 3;

Fig. 8 illustrates a modification of the construction of Fig. 5;

Fig. 9 illustrates the thermostatic protector of Fig. 3 in a different circuit arrangement for protecting an electric motor;

Figs. 10 and 11 illustrate alternate circuit arrangements for the system of Fig. 9;

Fig. 12 illustrates a modification of the thermostatic controller of Fig. 3, and includes a diagrammatic representation of still another circuit or protecting control system;

Fig. 13 illustrates another modified thermostatic circuit controller, and a diagrammatic representation of an electric motor protected thereby;

Figs. 14 and 15 are additional views of the thermostat of Fig. 13.

Figure 16:
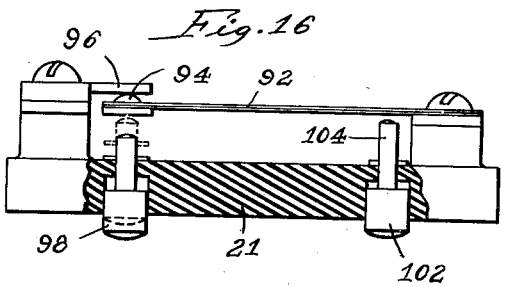
Figure 17:
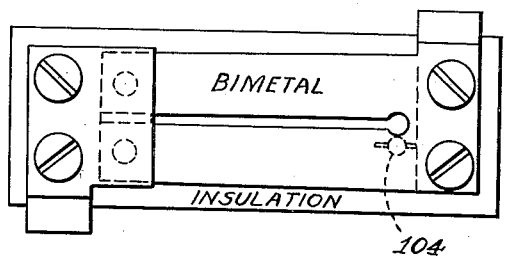
Figure 18:
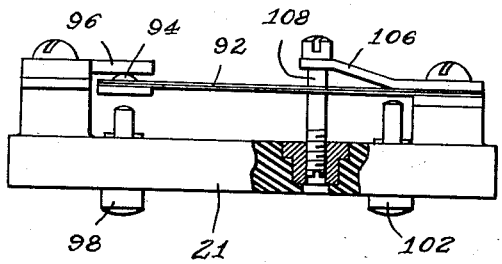

Figs. 16 and 17 illustrate a modification of the thermostatic protector of Figs. 13 and 14; and, Fig. 18 illustrates a further modification thereof.

For convenience in the description, the view of the thermostatic controller as shown in Fig. 3 is referred to as a plan of view, Fig. 5 as a side elevational view, and Figs. 4 and 6 as end elevations, and the other figures are referred to similarly.

In Figs. 1 and 2, a thermal protective device designated generally by the reference numeral 10 is shown mounted within the end bell of an electric motor where it is exposed to the internal heat of the motor. The ventilating air for the motor enters the end bell at the left of the motor housing through the opening 8, circulates through the motor, and leaves the housing from the end bell at the right of the machine as seen in Fig. 1, through the exit opening 9. The thermal protector 10, being located in the right end bell as shown in Fig. 1, is exposed to the ventilating air after it has been warmed by its passage across the motor windings, etc. In addition the thermal protector 10 is exposed to radiation from the various internal parts of the motor. This thermal protector 10 controls the power circuit of the motor and operates to deenergize the motor in response to the occurrence of high temperature or overload conditions in a manner to be described presently.

The thermal protector 10 itself is illustrated in Figs. 3 to 7 and includes a molded insulating base 11, a generally U-shaped snap acting, bimetallic thermal element 12 carrying a moving contact 14, and a pair of stationary electric contacts 16 and 18. The molded insulating base 11 includes an elongated, plate-like bottom portion 20, a partially bifurcated insulating post 22 at one end for supporting the bimetallic element 12 and its terminals, a pair of posts 24 at its other end for supporting the two stationary contacts 16 and 18 and a pair of threaded metal inserts 26 in the plate-like portion 20 for mounting the device in an electric motor or the like. Each of the two stationary contact plates 16 and 18 is generally L-shaped, as shown in Fig. 7, to provide a contact area for engaging the movable contact 14, a mounting tab for supporting it, and a notch for clearing the mounting screw of the other contact. A formed terminal tab, extending from the mounting tab engages the side of the insulating supporting post to hold the contact plate in proper alignment. These contact plates extend from their mountings toward the center of the device, as best seen in Fig. 5, to provide two opposed contact surfaces or stops, one above the other, for engaging the moving contact 14.

The bimetallic snap acting element 12 is made from a single strip of bimetal, slotted the greater portion of its length so that the element 12 is generally U-shaped with two substantially parallel legs 32 and 34 carrying the movable contact 14 at their joined end. At the open end of the U, each leg is mounted on a separate projection of the insulating post 22 so as to be insulated thereby from the other leg. Formed metal terminal members 36 and 38 are clamped by the same screws 40 and 42 that hold the bimetal legs 32 and 34 on the portion 22 of the insulating base. The U-shaped bimetal piece 12 is so formed that in its normally flat unstressed condition the distance between the two mounting holes in the legs 32 and 34 is slightly greater than the spacing between the threaded holes for receiving the mounting screws 40 and 42. Consequently, when mounted under the screws 40 and 42, the two legs 32 and 34 of the bimetal element are drawn slightly together.

This drawing together of the two legs of the U serves to stress the bimetal element 12 as a whole and to force the individual legs to twist slightly to deflect the unmounted contact carrying end of the bimetal into engagement with one of the stationary contacts 16 and 18. The device illustrated in Figs. 3 to 7 inclusive is so constructed that the high expansion material of the bimetal is on the lower face of the element 12, and the whole device is constructed and arranged so that at ordinary atmospheric temperatures the legs 32 and 34 of the bimetal element 12 take a twisted position wherein the inner edges of the legs 32 and 34 (next the central longitudinal slot) lie above the outer edges. This elevation of the central edge is greatest midway between the two ends of the bimetal element 12. In this, its normal position, the bimetal spring 12 holds the moving contact 14 in firm engagement with the lower stationary contact 16. Then at some higher temperature the legs 32 and 34 twist in the opposite direction so that the bimetal spring 12 holds the moving contact 14 in firm engagement with the upper stationary contact 18.

Accordingly, at ordinary atmospheric temperature the bimetal element 12 holds the movable contact 14 in firm engagement with the lower stationary contact 16 to provide a substantial contact pressure between the contact surfaces. As the temperature of the bimetal element is gradually raised, the bimetal element at first executes substantially no motion of the contact and so permits the contacts 14 and 16 to remain in firm engagement with each other, all until a certain temperature is reached, at which temperature the bimetal element 12 suddenly snaps to twist the bimetal legs in the opposite direction, and in so doing carries the movable contact 14 up into engagement with the upper stationary contact 18. During the time that the temperature rises gradually, the greater expansion of the lower face of the bimetal element or spring tends more and more to produce this reversal of the twist, but that tendency is opposed by the initial strain of the bimetal element as already described until the stored stresses in the material become sufficiently great to overcome that initial strain of the bimetal spring. Thereafter when the bimetal element has cooled to a somewhat lower temperature, it again abruptly changes back to its normal shape or position and so carries the contact 14 down into engagement with the stationary contact 16 with another snap motion.

The thermostatic protector of Fig. 3 mounted in the end bell of the electric motor as shown in Fig. 1 serves as an overload and overheat protector for the motor. Mounted in the motor in this manner, the thermostatic device responds to the temperature of the air within the motor housing, and connected in circuit with the starting and running windings of the motor as shown in Fig. 3, it responds to the value of current drawn by the motor, and thereby responds in a measure to the rate at which heat is generated within the motor.

In the circuit diagram of Fig. 3, a power conductor 50 is connected directly to the starting winding 52 and the running winding 54 of a split phase induction motor 56. The other power conductor 51 is connected to the lower stationary contact 16 of the thermal protective device 10 so that, when the thermal element 12 is in its normal cool position, with the moving contact 14 in engagement with the stationary contact 16, the circuit is completed through the separate legs 32 and 34 of the bimetal element 12 to the running and starting windings respectively of the motor 56. Included in series with the starting winding 52 is the usual centrifugal starting switch 58 for disconnecting the starting winding 52, after the motor has come up to speed. A lamp 60 is connected across the two stationary contacts 16 and 18 to indicate the operated condition of the thermal protector.

In operation, the bimetal element 12 normally holds the movable contact 14 in engagement with the stationary contact 16 to complete the circuit to the windings of the motor; but when heated, either by the air within the motor housing or by the current passing through the bimetal element itself to the motor windings, it snaps up against the stationary contact 18 to open the motor circuit at the contacts 14 and 16 and to connect the pilot light 60 in series with the motor windings. The pilot light 60 has a much higher resistance than that of the motor windings so that the lamp current flowing in the circuit to energize the lamp is negligible insofar as the motor is concerned. The light 60 provides a visual indication that the thermostatic protector has operated to deenergize the motor windings. With the motor deenergized, both the motor itself and the bimetal element 12 gradually cool until the bimetal element again snaps back to its normal position to again energize the motor to cause it to resume operation. If abnormal conditions persist, the bimetal element 12 will, after a time, again heat up and disconnect the motor from the line for a length of time sufficient to permit the motor to cool again to a temperature low enough to prevent overheating on a subsequent energization.

During the normal running condition of the motor, the starting winding is open at the centrifugal starting switch 58 so that current is carried only by the wider leg 32 of the bimetal element 12, and the heating effect of the motor current on the thermostatic protector is determined by the electrical resistance of this leg 32. It will be clear, however, that although under running conditions, the heat is generated only in the bimetal leg 32, that heat is generated comparatively slowly and is conducted from the leg 32 to the leg 34 so that both legs of the bimetal element will be at about the same temperature. Furthermore, both of the legs 32 and 34 will respond to the temperature of the air within the motor housing.

During the starting condition of the motor, current for the starting winding is drawn through the narrow bimetal leg 34 to energize the starting winding 52. Normally, the motor will come up to speed quickly and open its centrifugal starting switch 58, but should it fail to do so, it is imperative that the motor be disconnected from the line quickly, often within just a few seconds. During the starting condition, the running winding 54 itself draws a current several times its normal full load running current so as to generate heat rapidly in the bimetal element 32, but this rate of heat generation still may not be high enough to give the motor as great a degree of protection under stalled conditions as it enjoys against overload during the running condition, partly because the starting winding has a high resistance and so generates heat within the motor rapidly. Therefore, the bimetal leg 34 is made narrow to present a high resistance to the current of the starting winding so as to match the high rate of heating of that winding of motor with a high rate of heating of the thermal protector and thereby to match the heating effects in the two bimetal legs 32 and 34 to the protective requirements of the two separate windings. Preferably, the resistance of the narrow leg 34 is made great enough with respect to the resistance of the wider leg 32, and with respect to the relative values of current drawn by the starting and running windings under stalled conditions, that the current of the starting winding 52 is made to generate more heat in the narrow leg of the bimetal element than it would add to the other leg if it were drawn with the running current through the wider leg 32. According, the thermal protector operated in the system of Fig. 3, and acting essentially as a thermal relay when responding to the stalled condition of the motor, opens the motor circuit more quickly than it would if the total current for both windings were drawn through the single leg 32.

Fig. 8 illustrates a modification of the thermal protective element of Fig. 3, wherein means are provided for adjusting the thermal element to alter its operation. In Fig. 8, insulating post 23 for supporting the bimetal element 12 is slightly shorter than the corresponding insulating post 22 of the device of Fig. 2, and a plate 31 of insulating material is mounted atop the post 23 under the mounted ends of the two legs of the bimetal element 12. This insulating plate 31 extends out over the central plate portion 20 of the insulating base, under the bimetal element 12 and is engaged by an adjusting screw 33 threaded into the insulating base 20. This screw 33 turns up against the unmounted end of the plate 31 to flex it upwards, and the plate 31 in turn bears against the under face of the bimetal element 12 to oppose the tendency of the element to operate and so to require it to attain a higher temperature before it snaps to actuate the moving contact 14. Terminal members such as 36 and 38 of Fig. 3 are omitted under the legs of the bimetal element 12 so as to permit the bimetal element to lie against the adjusting plate 31.

Figs. 9, 10, and 11 illustrate a motor protector similar to that of Fig. 3 in a different type of motor protecting circuit, wherein the thermostatic protector of my present invention has the advantage of being easily adapted to the protection of motors of different sizes. In Fig. 9, the motor 66 is controlled by only a single circuit. This motor may be of the repulsion induction type, or may be a split phase motor or other type wherein the connections to the starting winding are not brought out from the motor to the protector separately from the connections of the running winding. In Fig. 9 the line connection is made to the protector at the stationary contact 16 (as in Fig. 3), and the motor connection is made to the mounted end of the wide leg 32 of the bimetal element 12. In this system, the entire motor current is carried by this leg 32 during both the starting and running conditions of the motor. The dimensions of the bimetal leg 32 and the electrical resistivity thereof must be of the correct values to match the heating effect of the current on the bimetal elements to the heating effect of the current on the motor 66 itself. Accordingly, a particular thermostatic protector of given dimensions and adjustments will best protect a motor of a particular size, when connected in circuit with that motor in the manner shown in Fig. 9. A larger motor may be accommodated by the same protector by the use of the circuit modification of Fig. 10 wherein the two bimetal elements 32 and 34 of the protector are connected in parallel to provide the correct heating effect from a higher value of current through the bimetal element. Similarly a smaller motor may be accommodated by the circuit modification of Fig. 11 wherein the current is carried by the narrow bimetal element only so that the required heating effect on the bimetal element is obtained with a lower value of current than is required by Fig. 9.

The thermostatic protector illustrated in Fig. 12 is similar to that illustrated in Fig. 3 with the exception that the two legs 33 and 35 of its bimetal element 13 are of the same width so as to be substantially equal in electrical resistance. In the system of Fig. 13, the motor 66 is controlled by a manually closeable circuit breaker or electric contactor 68 having a holding coil 70 which when energized maintains the circuit to the motor 66 closed. The mounted ends of the bimetal legs 33 and 35 are connected in series with the circuit through the motor 66, so that the entire motor current passes along one leg of the U to the joined or contact end and back along the other leg and so traverses the full length of each separate bimetal leg. This bimetal element 13 being connected in one side of the motor circuit, is at substantially the potential of one of the line conductors. The holding coil 70 of the circuit breaker is connected between the stationary contact 16 and the other line conductor so that when the thermal protector is in its normal or cold position (the circuit breaker 68 having been closed manually to energize the motor), the holding coil 70 remains energized to hold the circuit breaker 68 in its closed position. When the bimetal element 13 responds to excessive temperature or excessive current of the motor 66 to snap away from the stationary contact 16, it opens the circuit through the holding magnet 70 and so permits the contactor 68 to open to deenergize the motor 66. Upon cooling, the thermal element 13 recloses the connection to the contact 16, but this cooling of the thermal element 13 does not automatically restart the motor but merely restores the holding coil circuit to a condition which permits the motor to be again put into operation, manually.

Figs. 13, 14, and 15 illustrate still another modification of the thermostat of Fig. 3. Referring to Fig. 13, a U-shaped bimetal element 76 has a pair of legs 78 and 80, which are joined together at the mounted end 82 of the thermal element. The open end of the U-shaped piece of bimetal is closed by a metal bridge 84 pinned or riveted to the separate bimetal legs 78 and 80, and of such size that the bimetal legs 78 and 80, when riveted thereto are drawn slightly together to give the bimetal spring as a whole, a strain similar to that of the bimetal element 12 of the thermostat of Fig. 3. The bridge 84 constitutes a movable contact member and moves between stationary contacts 16 and 18. This thermostat of Fig. 13 is otherwise substantially like the thermostat of Fig. 3. In Fig. 13, the thermostat is shown connected in series with an electric motor 66, although it will be understood that the thermostat is in fact mounted inside of the motor 66, which is here represented only diagrammatically.

The thermostats of Figs. 3 and 12 possess the advantage over that of Fig. 13 of providing two separate bimetal paths for electric current so that the device is adaptable to a wider variety of circuit arrangements. The device of Fig. 13 has the advantage that the strain imposed upon the bimetal legs of the thermal element is not carried by the insulating mounting base so that the support for the thermal element need not be as rugged, and further need not be made to such exacting dimensions.

Figs. 16 and 17 illustrate a modification of the thermal protector of Figs. 13, 14 and 15, wherein means are provided for manually actuating the snap acting element of the protector to open and close the motor energizing circuit. As shown in Fig. 16, in this modification the thermal bimetal element 92 is constructed with its high expansion material at its upper face so that the thermal element normally holds its moving contact 94 in engagement with the upper stationary contact 96, and when heated snaps the moving contact down away from this upper stationary contact. This modification omits the lower stationary contact which, in the device of Fig. 14, serves as a stop for the snap acting bimetal element. Instead, the device of Fig. 16 includes a manually operable button 98 mounted in the insulating base 21. This manual button serves as the lower stop for the bimetal snap acting element 92, and is so dimensioned that when held in its uppermost position, it provides a stop spaced below the stationary contact just sufficiently far that the bimetal element 92, when cooled, can snap back to its normal position (the position shown in Fig. 16) and so that when the button 98 lies away from its uppermost position it permits the free end (the left end as seen in Fig. 16) of the bimetal element 92 to move down so far that the bimetal element, even after cooling to ordinary atmospheric temperatures will not snap back unaided to its normal position. Accordingly, the protector of Fig. 16 operates in response to a high temperature to open the circuit through its contacts just as does the thermal protector of Fig. 14, but can snap back to its circuit closing position only when both it itself has cooled to the same extent as is required of the thermostat of Fig. 14, and also the manual push button 98 is held in its uppermost position. Accordingly, the resetting or circuit closing operation of the device of Fig. 16 is non-automatic in that the device does not reclose an interrupted circuit without manual actuation of button 98, and it is "trip-free" in that it cannot be reclosed manually as long as its thermal element remains at a high temperature.

The device of Fig. 16 includes also a second manual push button 102 adapted to be forced upward against the lower face of the bimetal element 92 near its mounted end and just to one side of its central longitudinal slit. The pin 102 engages the bimetal element at the point 104 indicated in Fig. 17. An upward pressure exerted by the push button 102 at this point induces a normal snap action of the resilient bimetal element even though the bimetal element be at a low temperature, and so causes the moving contact to snap down away from the stationary contact against the pin 98 and so open the circuit. When so opened the device may be reclosed immediately by moving the pin 98 to its uppermost position. Accordingly, the manual push buttons 98 and 102 constitute manual "on" and "off" buttons for a manual control of the operation of the motor or other device connected thereto, as long as that operation does not produce an excessive temperature of the bimetal element 92. Should the bimetal element reach a high temperature, that high temperature prevents the reclosing of the circuit.

Fig. 18 illustrates a modification of Fig. 16 wherein the device in Fig. 16 is provided with an adjustment similar to that of Fig. 8. A formed metal plate 106 is clamped under the same screws that support the bimetal element 92 and a screw 108 threaded into an insert in the base permits the plate 106 to be bent down against the bimetal spring 92 to adjust the temperature at which it snaps.

While the thermal motor protectors as illustrated and described herein respond both to the motor temperature, and to the motor current, they can be made to respond to only one or the other. Thus, if the bimetal element is made with a low resistance so that the heating effect of the motor current is negligible, the device acts essentially as a thermostat only, and so responds only to motor temperature. But if instead, the bimetal element is located outside of the motor housing so as to be unaffected by motor heat, it acts only as a thermal relay and responds only to motor current. The invention is not limited to the specific constructions herein shown and described by way of example and illustration, but embraces all modifications and variations as fall within the scope of the appended claims.

I claim:

1. In combination in an apparatus of the character described, a U-shaped thin leaf spring of composite bimetal, the legs of the U being substantially parallel to each other, and the legs being held in a strained relationship at the open end of the U to cause the spring as a whole normally to assume a strained position, whereby said spring snaps automatically from one stable position to another in response to changes in temperature.

2. In combination in a device of the class described, a U-shaped, elongated thin leaf spring of composite bimetal mounted at one end, the legs of said U being substantially parallel to each other and held pulled together at the open end of the bimetal U to cause the spring as a whole normally to assume a strained position, whereby said bimetal spring snaps automatically from one stable position to another in response to a change of temperature to move the unmounted end of the spring from one position to another with a snap action, a movable stop for the free end of said bimetal spring to limit its motion in one direction in which it snaps in response to a change of temperature and thereby to determine one of said stable positions of said spring, said movable stop being manually movable to vary said one stable position of said spring, whereby to vary the temperature which said spring must attain before snapping automatically out of said one stable position.

3. In combination in a device of the class described, a U-shaped thin leaf spring of composite bimetal mounted at one end of its U, the legs of the U being held in a strained relationship at the open end of the U to cause the spring as a whole normally to assume a strained position, whereby said spring snaps through an unstable condition from one stable position to another upon a change of temperature, and means for applying a pressure to the bimetal spring near the mounted end thereof for causing said spring to snap from one of said stable positions to the other without a change of temperature, and in so doing, causing the unmounted end of said spring to move through a distance greater than the movement required of said means in initiating said snap action.

4. The combination of claim 3 wherein said U-shaped bimetal spring is mounted at the closed end of the U and wherein the strained relationship of the legs of the U consist in the ends of the legs at the open end of the bimetal U being drawn together to impose a bending moment upon the portion of the thin bimetal spring connecting the two legs at the closed end of the bimetal U.

5. In combination with a device of the class described, a U-shaped elongated thin leaf spring of composite bimetal mounted at the closed end of its U, the legs of said U being substantially parallel to each other and being held pulled together at the open end of the bimetal U to cause the spring as a whole normally to assume a strained position, whereby said bimetal spring snaps from one stable strained position to another in response to a change of temperature to move the unmounted end of the spring from one position to another with a snap action, means for applying pressure to the bimetal spring near the mounted end thereof for causing said spring to snap from one stable position to another in the direction in which the change would have occurred in response to the rise of temperature, but to do so without a change of temperature, a stop for the free end of said bimetal spring to limit its motion in the direction in which it snaps in response to a lowering of temperature, a movable stop for limiting the snap movement of the free end of said spring when it snaps in response to an increase in temperature, said movable stop being manually movable to vary the high temperature position of said spring whereby to vary the temperature to which said spring must be cooled for effecting a snap action upon a lowering of temperature, and an abutment for said manually movable stop for so limiting the motion thereof toward said bimetal spring (in the direction in which said bimetal spring snaps in response to a lowering of temperature), as to prevent said movable stop from holding said bimetal spring against the first mentioned stop, whereby, when said bimetal spring is at a normal low temperature, it may be actuated without a change of temperature to snap back and forth between said two stable positions in response to actuation by said means for applying pressure and by said movable stop, and whereby said bimetal spring may be made to snap into its normal low temperature position only when said bimetal spring itself has cooled to a predetermined temperature and said movable stop is moved in the direction toward said bimetal spring.

6. The combination of claim 1 wherein mounting means support the bimetal spring at the open end of the U, and wherein said spring is held in said strained relationship solely by its mounting.

7. The combination of claim 1 wherein insulating mounting material supports said U-shaped bimetal spring at the open end of said U, and wherein said legs are held in strained relationship solely by said insulating mounting material, and contact means carried by the movable free end of said bimetal spring, whereby each separate leg of said U provides a separate electrically conducting path from said contact.

8. The combination of claim 1 wherein the separate legs of said U are of different widths, but wherein each separate leg of said U is of substantially uniform width throughout the greater portion of its length, whereby said legs have different electrical and mechanical properties.

9. The combination of claim 1 wherein said bimetal spring is mounted in cantilever fashion at one end thereof, and wherein there is provided an adjustable means for applying pressure to one face of said spring near the mounted end thereof for altering the temperature at which said spring snaps from one stable strained position to the other.

10. In combination in an apparatus of the character described, an elongated spring having a longitudinal slot dividing the spring into two approximately parallel elongated legs, said slot terminating short of the two ends of the spring so as to leave end portions thereof connecting the two legs, said legs being constructed of thin composite bimetal, the connecting portion at one end of said legs being so formed that it tends to swing the legs to bring the opposite ends thereof to a different distance apart than that at which they are held by the connecting portion at said opposite end, whereby said opposite connecting portion in holding said legs as aforesaid, imposes a bending stress upon the first connecting portion and causes said spring to assume a strained configuration, and whereby further said spring snaps automatically through an unstable conformation, from one stable conformation to another in response to changes in temperature.

11. The combination of claim 1 wherein insulating mounting means supports the legs of said bimetal U at the open end thereof and insulates said legs from each other, whereby each separate leg of said U may constitute a part of a separate electrically conducting path from the closed end of said bimetal U.

12. The combination of claim 1, wherein insulating mounting means supports the legs of said U at the open end thereof and insulates said legs from each other at said mounted end, and wherein said separated legs of the U have different electrical resistances.

MALCOLM W. EATON.